US009571247B2

(12) United States Patent  
Xiong et al.

(10) Patent No.: US 9,571,247 B2
(45) Date of Patent: Feb. 14, 2017

(54) METHOD AND APPARATUS FOR CONTROLLING CSI REPORT

(71) Applicant: Alcatel Lucent, Boulogne Billancourt (FR)

(72) Inventors: Zhilan Xiong, Shanghai (CN); Min Zhang, Swindon (GB); Yun Deng, Shanghai (CN); Hongwei Yang, Shanghai (CN); Fang-Chen Cheng, Randloph, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/417,641

(22) PCT Filed: Jul. 22, 2013

(86) PCT No.: PCT/IB2013/001761
§ 371 (c)(1),
(2) Date: Jan. 27, 2015

(87) PCT Pub. No.: WO2014/020434
PCT Pub. Date: Feb. 6, 2014

(65) Prior Publication Data
US 2015/0222400 A1   Aug. 6, 2015

(30) Foreign Application Priority Data

Aug. 3, 2012 (CN) .......................... 2012 1 0275757

(51) Int. Cl.
*H04J 1/16* (2006.01)
*H04W 4/00* (2009.01)
(Continued)

(52) U.S. Cl.
CPC ........... *H04L 5/0048* (2013.01); *H04B 7/0626* (2013.01); *H04L 1/003* (2013.01);
(Continued)

(58) Field of Classification Search
CPC ...... H04L 5/001; H04L 5/0085; H04L 5/0094; H04L 1/0026; H04L 1/0027; H04W 24/10; H04W 72/042
See application file for complete search history.

(56) References Cited

U.S. PATENT DOCUMENTS 8,902,764 B2   12/2014   Imai et al.
9,084,289 B2   7/2015   Mazzarese et al.
(Continued)

FOREIGN PATENT DOCUMENTS

CN   102624495         8/2012
RU   2419974 C2        5/2011
(Continued)

OTHER PUBLICATIONS

ZTE, "CSI feedback modes for CoMP," 3rd Generation Partnership Project (3GPP), 3GPP TSG RAN WG1 #69, R1-122135, 5 pages, XP050600408, Prague, Czech Republic, May 21-25, 2012.
(Continued)

*Primary Examiner* — Melanie Jagannathan
(74) *Attorney, Agent, or Firm* — Fay Sharpe, LLP

(57) ABSTRACT

The present invention relates to a method and an apparatus for controlling a Channel State Information (CSI) report. According to an embodiment of the present invention, a method for controlling a CSI report of a User Equipment (UE) in a base station of a Long Term Evolution (LTE) mobile communication network is provided. The method includes a step of determining a CSI report set for a UE, where the CSI report set includes multiple CSI feedback modes, and each CSI feedback mode is defined to include a Non-Zero Power Reference Signal (NZP RS) resource part for channel measurement and an Interference Measurement Resource (IMR) part for interference measurement. In addition, the method further includes a step of sending to the UE
(Continued)

Radio Resource Control (RRC) signaling indicating the CSI report set.

14 Claims, 2 Drawing Sheets

(51) Int. Cl.
| | |
|---|---|
| H04L 5/00 | (2006.01) |
| H04L 1/00 | (2006.01) |
| H04B 7/06 | (2006.01) |
| H04W 24/10 | (2009.01) |
| H04W 72/04 | (2009.01) |

(52) U.S. Cl.
CPC .......... *H04L 1/0026* (2013.01); *H04L 1/0027* (2013.01); *H04L 1/0031* (2013.01); *H04L 1/0077* (2013.01); *H04W 24/10* (2013.01); *H04W 72/042* (2013.01)

(56) References Cited

U.S. PATENT DOCUMENTS

| | | | |
|---|---|---|---|
| 2008/0117849 A1 | 5/2008 | Borran et al. | |
| 2012/0213261 A1* | 8/2012 | Sayana | H04L 5/0094 375/224 |
| 2012/0243497 A1* | 9/2012 | Chung | H04L 5/0055 370/329 |
| 2012/0287875 A1* | 11/2012 | Kim | H04W 76/046 370/329 |
| 2012/0314611 A1 | 12/2012 | Baker et al. | |
| 2013/0003788 A1* | 1/2013 | Marinier | H04B 7/024 375/219 |
| 2013/0279363 A1* | 10/2013 | Huang | H04L 5/001 370/252 |
| 2013/0279463 A1* | 10/2013 | Park | H04B 7/0626 370/329 |
| 2014/0126402 A1* | 5/2014 | Nam | H04W 24/08 370/252 |
| 2014/0169208 A1 | 6/2014 | Li et al. | |
| 2015/0162966 A1* | 6/2015 | Kim | H04B 17/00 370/252 |
| 2015/0222400 A1* | 8/2015 | Xiong | H04L 1/0026 370/329 |

FOREIGN PATENT DOCUMENTS

| | | |
|---|---|---|
| RU | 2446621 C2 | 3/2012 |
| TW | 201208315 A1 | 2/2012 |
| TW | 201218673 A1 | 5/2012 |

OTHER PUBLICATIONS

ZTE, "Downlink control signaling for CoMP," 3$^{rd}$ Generation Partnership Project (3GPP), 3GPP TSG RAN WG1 #69, R1-122143, pp. 1-5, XP050600411, Prague, Czech Republic, May 21-25, 2012.

Fujitsu, "Email discussion [69-11]: FFS aspects of aperiodic CSI feedback for CoMP," 3$^{rd}$ Generation Partnership Project (3GPP), 3GPP TSG RAN WG1 #69 R1-122931, pp. 122, XP050660967, Prague, Czech Republic, May 21-25, 2012.

Huawei et al., "CSI feedback modes for CoMP," 3$^{rd}$ Generation Partnership Project (3GPP), 3GPP TSG RAN WG1 #69, R1-121946, pp. 3 pages, XP050600247, Czech Republic, May 21-25, 2012.

Alcatel-Lucent et al., "Interference Measurement for CoMP," 3$^{rd}$ Generation Partnership Project (3GPP), 3GPP TSG RAN WG1 #69, R1-122482, pp. 5 pages, XP050601106, Prague, Czech Republic, May 21-25, 2012.

International Search Report for PCT/IB2013/001761 dated Dec. 6, 2013.

\* cited by examiner

METHOD AND APPARATUS FOR CONTROLLING CSI REPORT

BACKGROUND OF THE INVENTION

Field of the Invention

The present invention generally relates to mobile communications technologies, and more particularly, to Channel State Information (CSI) feedback.

Description of the Prior Art

In a modern mobile communication system such as a Long Term Evolution (LTE) system, a base station determines a transmission format, a transmission block size, a modulation and coding scheme, a Multiple Input Multiple Output (MIMO) transmission mode and the like to be used in a downlink (DL) and an uplink (UL). To perform such determination for the DL, the base station needs information about the performance of a current DL channel from a User Equipment (UE), and the information is generally referred to as Channel State Information (CSI).

Frequency Division Multiplexing (FDD) DL coordinated multi-point (coordinated multi-point, CoMP) transmission has potential in improving the coverage area, cell edge throughput, and/or spectral efficiency. In the CoMP transmission, multiple transmission modes exist, such as Joint Transmission (JT), Dynamic Point Selection (DPS), Dynamic Point Blanking (DPB), and Coordinated Scheduling/Beamforming (CS/CB). Moreover, the DPS may be combined with the JT. In addition, a hybrid type of the JT and the CS/CB is also possible.

The diversity of the transmission mode in the CoMP means that the UE may be faced with multiple interference assumptions, so interference measurement for the CoMP is necessary. Because of the introduction of an Interference Measurement Resource (IMR), a conventional CSI report mode is no longer applicable.

SUMMARY OF THE INVENTION

One objective of an embodiment of the present invention is to provide a CSI report mode capable of supporting network configuration of an IMR.

According to an embodiment of the present invention, a method for controlling a CSI report of a UE in a base station of an LTE mobile communication network is provided. The method includes a step of determining a CSI report set for a UE, where the CSI report set includes multiple CSI feedback modes, and each CSI feedback mode is defined to include a Non-Zero Power Reference Signal (NZP RS) resource part for channel measurement and an IMR part for interference measurement. In addition, the method further includes a step of sending to the UE Radio Resource Control (RRC) signaling indicating the CSI report set.

According to another embodiment of the present invention, a base station suitable for controlling a CSI report of a UE in an LTE mobile communication network is provided. The base station includes a first unit and a transmitter. The first unit is configured to determine a CSI report set for a UE, where the CSI report set includes multiple CSI feedback modes, and each CSI feedback mode is defined to include an NZP RS resource part for channel measurement and an IMR part for interference measurement. The transmitter is configured to send to the UE RRC signaling indicating the CSI report set.

The technical features and advantages of the present invention are summarized above, so as to make the following detailed descriptions of the present invention easier to understand. Other features and advantages of the present invention will be described in the following, which form the subject of the claims of the present invention. It should be understood by persons skilled in the art that the disclosed concepts and embodiments may be easily used as a basis for modifying or designing other structures or procedures for implementing the same objective as the present invention. It should also be understood by persons skilled in the art that the equivalent construction does not depart from the spirit and scope of the appended claims.

BRIEF DESCRIPTION OF THE DRAWINGS

With reference to the accompanying drawings, the following detailed descriptions about the exemplary embodiments of the present invention are easier to understand. The present invention is illustrated through the examples and is not limited to the accompanying drawings. Similar symbols in the accompanying drawings indicate similar components.

DETAILED DESCRIPTION

The detailed descriptions of the accompanying drawings are intended to illustrate current exemplary embodiments of the present invention, rather than to represent the only implementation forms of the present invention. It should be understood that the same or equivalent function may be completed by different embodiments that are intended to be included within the spirit and scope of the present invention.

It should be understood by persons skilled in the art that the means and functions described herein may be implemented by using software functions combining a program control microprocessor and a general-purpose computer, and/or implemented by using an application-specific integrated circuit (ASIC). It should also be understood that, although the present invention is mainly illustrated in the form of methods and apparatuses, the present invention may also be embodied by a computer program product and a system including a computer processor and a memory connected to the processor, where the memory is encoded by using one or more programs that may complete the functions disclosed herein.

It should be understood by persons skilled in the art that a base station is denoted by different technical terms in different protocol standards. For example, a base station in an LTE system or an LTE-Advanced (LTE-A) system is referred to as a Node B or an evolved Node B (eNB). The base station in the present invention may be, but is not limited to, an eNB in an LTE-A system.

Figure 1:
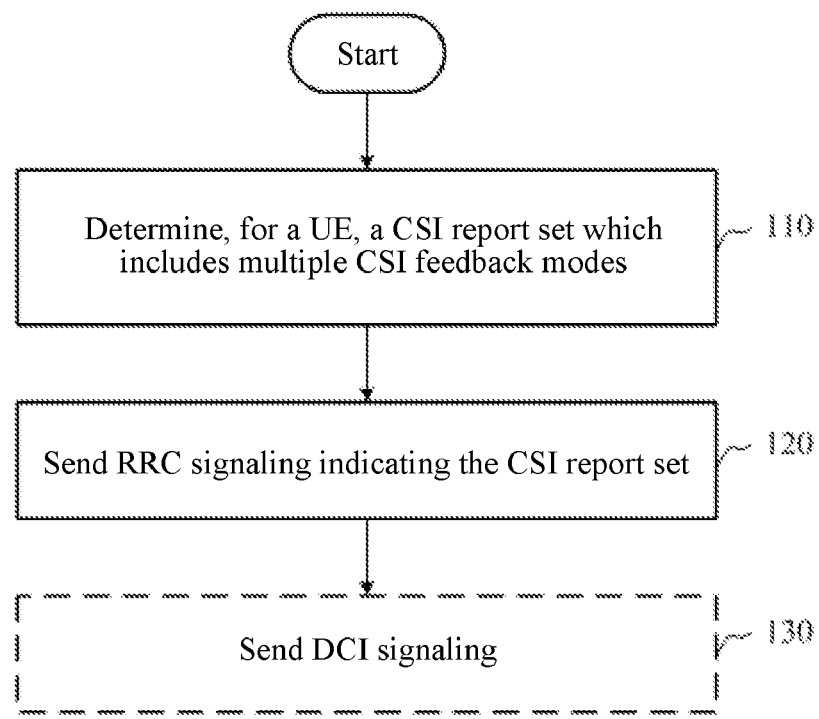
FIG. 1 is a flowchart of a method for controlling a CSI report of a UE in a base station of an LTE mobile communication network according to an embodiment of the present invention.

Generally, a CSI report is sent by a UE to a serving base station (serving eNB) thereof, and the serving base station needs to indicate configuration of the CSI report. FIG. 1 is a flowchart of a method for controlling a CSI report of a UE in a base station of an LTE mobile communication network according to an embodiment of the present invention. The method includes steps 110 and 120.

In step 110, a serving base station determines a CSI report set for a UE. The CSI report set includes multiple CSI feedback modes of the UE, where each CSI feedback mode is defined to include an NZP RS resource part for channel measurement and an IMR part for interference measurement.

In step 120, a serving base station sends to the UE RRC signaling indicating the CSI report set. After receiving the RRC signaling, the UE learns an available resource of the CSI report for CoMP transmission.

According to an embodiment, the CSI report set includes all possible CSI feedback modes. For example, when 3 NZP CSI-RS resources and 2 IMRs are allocated to the UE, the CSI report set includes 6 CSI feedback modes, as can be seen in Table 1. It should be understood by persons skilled in the art that, the number 3 or 2 of the NZP CSI-RS resources or IMRs is merely exemplary but not for limitation.

TABLE 1

All possible CSI feedback modes of 3 NZP CSI-RS resources and 2 IMRs

| Sequence number of CSI feedback mode | Channel part | Interference part |
|---|---|---|
| 1 | NZP CSI-RS #1 | IMR *1 |
| 2 | NZP CSI-RS #2 | IMR *1 |
| 3 | NZP CSI-RS #3 | IMR *1 |
| 4 | NZP CSI-RS #1 | IMR *2 |
| 5 | NZP CSI-RS #2 | IMR *2 |
| 6 | NZP CSI-RS #3 | IMR *2 |

Generally, the CoMP solution supported by the network does not involve all the possible CSI feedback modes. Therefore, the serving base station may further indicate the CSI feedback mode that involves the CSI report of the UE to save system resources. In this case, the method may further include step 130 in addition to steps 110 and 120. In step 130, the serving base station sends Downlink Control Information (DCI) signaling to the UE, where the DCI signaling indicates the part, in the multiple CSI feedback modes, that involves the CSI report of the UE.

Three solutions are provided to indicate the part, of the CSI feedback modes, that involves the CSI report of the UE.

Figure 2:
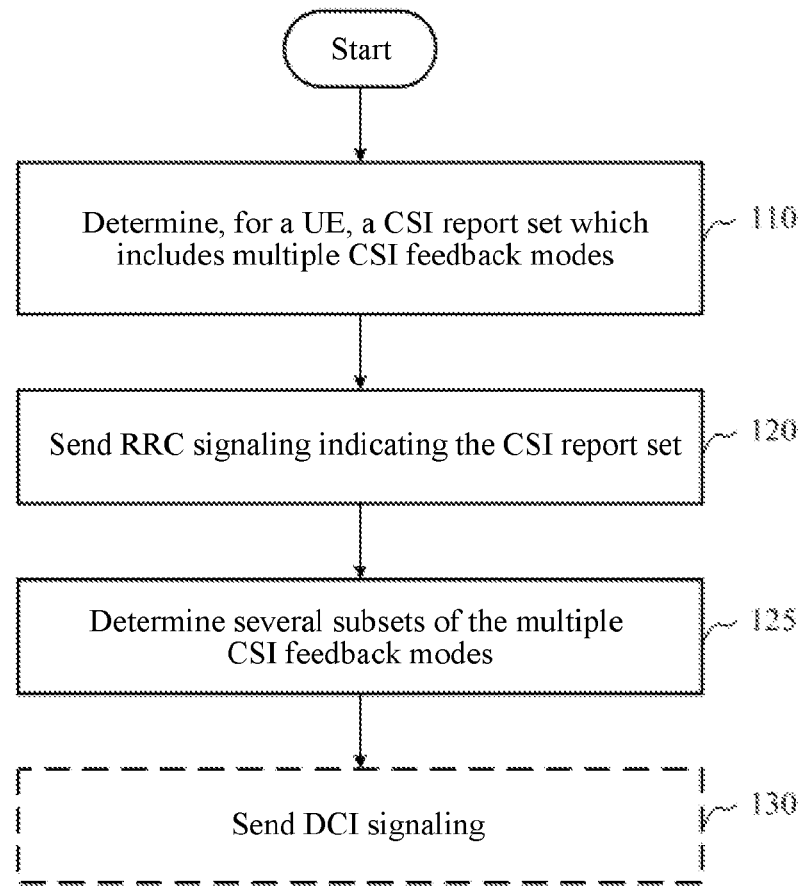
FIG. 2 is a flowchart of a method for controlling a CSI report of a UE in a base station of an LTE mobile communication network according to an embodiment of the present invention.

In the first solution, the method further includes step 125 in addition to steps 110, 120 and 130, as shown in FIG. 2. For convenience, the relationship of the steps is shown in FIG. 2, but in practice, step 120 and step 125 have no specific sequence. In step 125, the serving base station determines several subsets of the multiple CSI feedback modes, and in step 130, the sent DCI signaling indicates a subset, of the multiple CSI feedback modes, that involves the CSI report of the UE. These subsets may also be indicated to the UE by the RRC signaling. Each subset preferably corresponds to a CoMP solution that can be supported by the network. An exemplary configuration of subsets of the possible CSI feedback modes shown in Table 1 is provided in Table 2, where a first subset corresponds to a CoMP solution emphasizing interference measurement, and a second, a third and a fourth subset correspond to CoMP solutions emphasizing a first, a second and a third Transmission Point (TP) respectively. In this case, 2-bit DCI signaling is enough to indicate a sequence number of a subset of the CSI feedback mode.

TABLE 2

An example about configuration of subsets of CSI feedback modes

| Sequence number of subset of CSI feedback mode | CSI feedback mode in subset | Description |
|---|---|---|
| 1 | CSI feedback modes 4, 5 and 6 | Interference measurement based on IMR *2 |
| 2 | CSI feedback modes 1 and 4 | TP1 and IMR *1 and IMR *2 |
| 3 | CSI feedback modes 2 and 5 | TP2 and IMR *1 and IMR *2 |
| 4 | CSI feedback modes 3 and 6 | TP3 and IMR *1 and IMR *2 |

It should be understood by persons skilled in the art that the configuration in Table 2 is exemplary but not for limitation. Certain principles of the configuration of a CSI feedback subset are as follows: (1) the configuration of the CSI feedback subset involves several CoMP solutions, and these CoMP solutions can be supported by the network and may be adopted in a next period of the RRC signaling; (2) the CSI feedback mode in a subset may share or not share a common IMR; (3) the CSI feedback mode in a subset may share or not share a common NZP CSI-RS resource; and (4) the number of the CSI feedback modes in the subset may be different. Therefore, the first solution is suitable for dynamic configuration of NZP CSI-RS resources and IMRs.

In the second solution, the part, in the multiple CSI feedback modes, that involves the CSI report of the UE corresponds to a specific IMR, and the DCI signaling sent in step 130 indicates the specific IMR. For example, when two IMRs are allocated to the UE and all the NZP CSI-RS resources are associated with one of the two IMRs, a 1-bit DCI is enough to indicate whether IMR *1 or IMR *2 is used. Unlike the first solution, the second solution does not need to configure the CSI feedback subset explicitly. Instead, all the NZP CSI-RS resources are associated with the specific IMR. Therefore, the second solution is suitable for a dynamic interference assumption.

In the third solution, the part, in the multiple CSI feedback modes, that involves the CSI report of the UE corresponds to a specific NZP RS resource, and the DCI signaling sent in step 130 indicates the specific NZP RS resource. For example, when three NZP CSI-RS resources are allocated to the UE and each NZP CSI-RS resource is associated with all the IMRs, 2-bit DCI signaling is enough to indicate selection of the NZP CSI-RS resource #1, #2 or #3. Unlike the first solution, the third solution does not need to configure the CSI feedback subset explicitly. Instead, each NZP CSI-RS resource is associated with all the IMRs. Therefore, the third solution is suitable for dynamic switching of a TP.

According to another embodiment, the CSI report set determined in step 110 includes a part of possible CSI feedback modes, and all the CSI feedback modes in the CSI report set involve the CSI report of the UE.

According to a solution, each CSI feedback mode in the CSI report set involves a specific IMR. Preferably, each CSI feedback mode in the CSI report set involves a specific NZP CSI-RS resource. For example, when 3 NZP CSI-RS resources and 3 IMRs are allocated to the UE, the CSI report set may include 3 CSI feedback modes, as can be seen in Table 1. It should be understood by persons skilled in the art that, the number of the NZP CSI-RS resources or IMRs is merely exemplary but not for limitation. The solution may compensate a limited feedback channel over a UL and CSI information required for scheduling at the network side.

TABLE 3

An example of configuration of CSI feedback modes

| Sequence number of CSI feedback mode | Channel part | Interference part |
|---|---|---|
| 1 | NZP CSI-RS #1 | IMR *1 |
| 2 | NZP CSI-RS #2 | IMR *2 |
| 3 | NZP CSI-RS #3 | IMR *3 |

According to resource allocation, IMR *1 to IMR *3 are orthogonal to each other, and the three IMRs can determine three different interference assumptions. The above configuration can directly provide CoMP specific CSI feedback from the UE side. For example, a first CSI feedback mode is used for CS/CB, a second CSI feedback mode is used for DPS where TP2 is used as a TP, and a third CSI feedback mode is used for DPS where TP3 is used as a TP.

For a periodic CSI report, the RRC signaling sent in step 120 presets a report period for all the CSI feedback modes in the CSI report set.

For an aperiodic CSI report, the method may include a step, in addition to steps 110 and 120, of sending DCI signaling to trigger an aperiodic CSI report of the UE. In this case, a 1-bit indicator is enough for triggering.

According to another solution, each CSI feedback mode in the CSI report set shares the same IMR. For example, when 3 NZP CSI-RS resources and several IMRs are allocated to the UE, the CSI report set may include 3 CSI feedback modes, as can be seen in Table 4. It should be understood by persons skilled in the art that, the number of the NZP CSI-RS resources or IMRs is merely exemplary but not for limitation.

TABLE 4

An example of configuration of CSI feedback modes

| Sequence number of CSI feedback mode | Channel part | Interference part |
|---|---|---|
| 1 | NZP CSI-RS #1 | IMR *1 |
| 2 | NZP CSI-RS #2 | IMR *1 |
| 3 | NZP CSI-RS #3 | IMR *1 |

Because the CSI feedback mode is controlled by the network for scheduling and transmitted by the RRC signaling, the above configuration can provide the maximum scheduling flexibility. Therefore, the CoMP specific CSI can be partly reconfigured at the network side. Such type of configuration may save certain CSI resources.

For a periodic CSI report, the RRC signaling sent in step 120 presets a report period for all the CSI feedback modes in the CSI report set.

For an aperiodic CSI report, the method may include a step, in addition to steps 110 and 120, of sending DCI signaling to trigger an aperiodic CSI report of the UE. In this case, a 1-bit indicator is enough for triggering.

In all the above embodiments, the DCI signaling may use an undefined item of a CSI request field.

Figure 3:
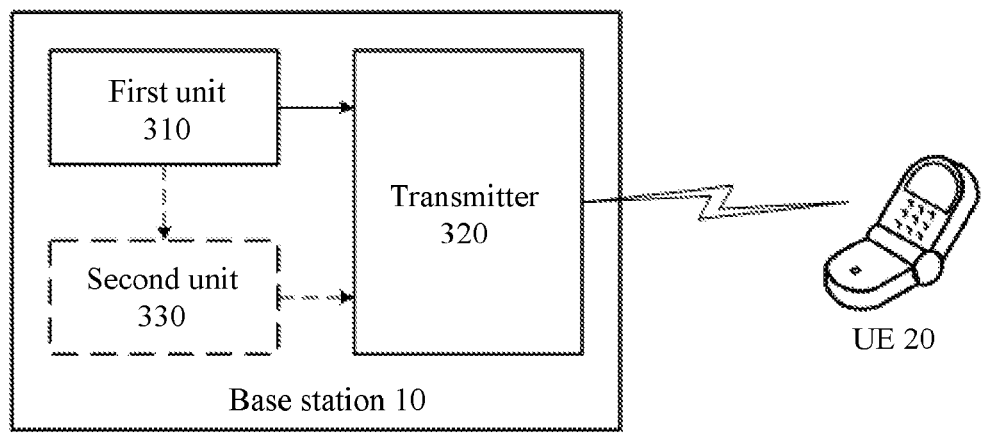
FIG. 3 is a structural block diagram of a base station suitable for controlling a CSI report of a UE in an LTE mobile communication network according to an embodiment of the present invention.

FIG. 3 is a structural block diagram of a base station 10 suitable for controlling a CSI report of a UE 20 in an LTE mobile communication network according to an embodiment of the present invention. Generally, the base station 10 is a serving base station of the UE 20. As shown in FIG. 3, the base station 10 includes a first unit 310 and a transmitter (or transceiver) 320.

The first unit 310 is configured to determine a CSI report set for the UE 20. The CSI report set includes multiple CSI feedback modes of the UE 20, where each CSI feedback mode is defined to include an NZP RS resource part for channel measurement and an IMR part for interference measurement.

The transmitter 320 is configured to send to the UE 20 RRC signaling indicating the CSI report set. After receiving the RRC signaling, the UE 20 learns an available resource of the CSI report for CoMP transmission.

According to an embodiment, the CSI report set includes all possible CSI feedback modes. For example, when 3 NZP CSI-RS resources and 2 IMRs are allocated to the UE 20, the CSI report set includes 6 CSI feedback modes, as can be seen in Table 1. It should be understood by persons skilled in the art that, the number 3 or 2 of the NZP CSI-RS resources or IMRs is merely exemplary but not for limitation.

Generally, the CoMP solution supported by the network does not involve all the possible CSI feedback modes. Therefore, the base station 10 may further indicate the CSI feedback mode that involves the CSI report of the UE 20 to save system resources. In this case, the transmitter may be configured to further send DCI signaling to the UE 20, where the DCI signaling indicates the part, in the multiple CSI feedback modes, that involves the CSI report of the UE 20.

Three solutions are provided to indicate the part, of the CSI feedback modes, that involves the CSI report of the UE 20.

In the first solution, the base station 10 includes a second unit 330, configured to determine several subsets of the multiple CSI feedback modes, where the sent DCI signaling indicates a subset, of the multiple CSI feedback modes, that involves the CSI report of the UE 20. These subsets may also be indicated to the UE 20 by the RRC signaling. Each subset preferably corresponds to a CoMP solution that can be supported by the network. An exemplary configuration of subsets of the possible CSI feedback modes shown in Table 1 is provided in Table 2, where a first subset corresponds to a CoMP solution emphasizing interference measurement, and a second, a third and a fourth subset correspond to CoMP solutions emphasizing a first, a second and a third TP respectively. In this case, 2-bit DCI signaling is enough to indicate a sequence number of a subset of the CSI feedback mode.

It should be understood by persons skilled in the art that the configuration in Table 2 is exemplary but not for limitation. Certain principles of the configuration of a CSI feedback subset are as follows: (1) the configuration of the CSI feedback subset involves several CoMP solutions, and these CoMP solutions can be supported by the network and may be adopted in a next period of the RRC signaling; (2) the CSI feedback mode in a subset may share or not share a common IMR; (3) the CSI feedback mode in a subset may share or not share a common NZP CSI-RS resource; and (4) the number of the CSI feedback modes in the subset may be different. Therefore, the first solution is suitable for dynamic configuration of NZP CSI-RS resources and IMRs.

In the second solution, the part, in the multiple CSI feedback modes, that involves the CSI report of the UE 20 corresponds to a specific IMR, and the sent DCI signaling indicates the specific IMR. For example, when two IMRs are allocated to the UE 20 and all the NZP CSI-RS resources are associated with one of the two IMRs, a 1-bit DCI is enough to indicate whether IMR *1 or IMR *2 is used. Unlike the first solution, the second solution does not need to configure the CSI feedback mode subset explicitly. Instead, all the NZP CSI-RS resources are associated with the specific IMR. Therefore, the second solution is suitable for a dynamic interference assumption.

In the third solution, the part, in the multiple CSI feedback modes, that involves the CSI report of the UE 20 corresponds to a specific NZP RS resource, and the sent DCI signaling indicates the specific NZP RS resource. For example, when three NZP CSI-RS resources are allocated to the UE 20 and each NZP CSI-RS resource is associated with all the IMRs, 2-bit DCI signaling is enough to indicate selection of the NZP CSI-RS resource #1, #2 or #3. Unlike the first solution, the third solution does not need to configure the CSI feedback subset explicitly. Instead, each NZP CSI-RS resource is associated with all the IMRs. Therefore, the third solution is suitable for dynamic switching of a TP.

According to another embodiment, the CSI report set determined by the first unit 310 includes a part of possible CSI feedback modes, and all the CSI feedback modes in the CSI report set involve the CSI report of the UE 20.

According to a solution, each CSI feedback mode in the CSI report set involves a specific IMR. Preferably, each CSI feedback mode in the CSI report set involves a specific NZP CSI-RS resource. For example, when 3 NZP CSI-RS resources and 3 IMRs are allocated to the UE 20, the CSI report set may include 3 CSI feedback modes, as can be seen in Table 1. It should be understood by persons skilled in the art that, the number of the NZP CSI-RS resources or IMRs is merely exemplary but not for limitation. The solution may compensate a limited feedback channel over a UL and CSI information required for scheduling at the network side.

According to resource allocation, IMR *1 to IMR *3 are orthogonal to each other, and the three IMRs can determine three different interference assumptions. The above configuration can directly provide CoMP specific CSI feedback from the UE side. For example, a first CSI feedback mode is used for CS/CB, a second CSI feedback mode is used for DPS where TP2 is used as a TP, and a third CSI feedback mode is used for DPS where TP3 is used as a TP.

For a periodic CSI report, the RRC signaling sent by the transmitter 320 presets a report period for all the CSI feedback modes in the CSI report set.

For an aperiodic CSI report, the transmitter 320 may be configured to further send DCI signaling to trigger the aperiodic CSI report of the UE. In this case, a 1-bit indicator is enough for triggering.

According to another solution, each CSI feedback mode in the CSI report set shares the same IMR. For example, when 3 NZP CSI-RS resources and several IMRs are allocated to the UE 20, the CSI report set may include 3 CSI feedback modes, as can be seen in Table 4. It should be understood by persons skilled in the art that, the number of the NZP CSI-RS resources or IMRs is merely exemplary but not for limitation.

Because the CSI feedback mode is controlled by the network for scheduling and transmitted by the RRC signaling, the above configuration can provide the maximum scheduling flexibility. Therefore, the CoMP specific CSI can be partly reconfigured at the network side. Such type of configuration may save certain CSI resources.

For a periodic CSI report, the RRC signaling sent by the transmitter 320 presets a report period for all the CSI feedback modes in the CSI report set.

For an aperiodic CSI report, the transmitter 320 is configured to further send DCI signaling to trigger the aperiodic CSI report of the UE. In this case, a 1-bit indicator is enough for triggering.

In all the above embodiments, the DCI signaling may use an undefined item of a CSI request field.

Different embodiments of the present invention being illustrated and described above, the present invention is not limited to these embodiments. Many modifications, alterations, variations, replacements and equivalences are obvious to persons skilled in the art without departing from the spirit and scope of the present invention described in the claims.

We claim:

1. A method for controlling a Channel State Information (CSI) report of a User Equipment (UE) in a base station of a Long Term Evolution (LTE) mobile communication network, comprising:
    determining a CSI report set for the UE, wherein the CSI report set comprises multiple CSI feedback modes, and each CSI feedback mode is defined to comprise a Non-Zero Power Reference Signal (NZP RS) resource part for channel measurement and an Interference Measurement Resource (IMR) part for interference measurement; and
    sending to the UE Radio Resource Control (RRC) signaling indicating the CSI report set.

2. The method according to claim 1, wherein the CSI report set comprises all possible CSI feedback modes, and the method further comprises:
    sending Downlink Control Information (DCI) signaling to the UE, wherein the DCI signaling indicates the part, in the multiple CSI feedback modes, that involves the CSI report of the UE.

3. The method according to claim 2, further comprising:
    determining several subsets of the multiple CSI feedback modes, wherein
    the DCI signaling indicates a subset, of the multiple CSI feedback modes, that involves the CSI report of the UE.

4. The method according to claim 2, wherein the part, in the multiple CSI feedback modes, that involves the CSI report of the UE corresponds to a specific IMR, and the DCI signaling indicates the specific IMR.

5. The method according to claim 2, wherein the part, in the multiple CSI feedback modes, that involves the CSI report of the UE corresponds to a specific NZP RS resource, and the DCI signaling indicates the specific NZP RS resource.

6. A base station suitable for controlling a Channel State Information (CSI) report of a User Equipment (UE) in a Long Term Evolution (LTE) mobile communication network, comprising:
    a first unit, configured to determine a CSI report set for the UE, wherein the CSI report set comprises multiple CSI feedback modes, and each CSI feedback mode is defined to comprise a Non-Zero Power Reference Signal (NZP RS) resource part for channel measurement and an Interference Measurement Resource (IMR) part for interference measurement; and
    a transmitter, configured to send to the UE Radio Resource Control (RRC) signaling indicating the CSI report set.

7. The base station according to claim 6, further comprising:
    a second unit, configured to determine several subsets of the multiple CSI feedback modes, wherein the DCI signaling indicates a subset, of the multiple CSI feedback modes, that involves the CSI report of the UE.

8. The base station according to claim 6, wherein the part, in the multiple CSI feedback modes, that involves the CSI report of the UE corresponds to a specific IMR, and the DCI signaling indicates the specific IMR.

9. The base station according to claim 6, wherein the part, in the multiple CSI feedback modes, that involves the CSI report of the UE corresponds to a specific NZP RS resource, and the DCI signaling indicates the specific NZP RS resource.

10. The base station according to claim 6, wherein the CSI report set comprises a part of possible CSI feedback modes, and all the CSI feedback modes in the CSI report set involve the CSI report of the UE.

11. The base station according to claim 10, wherein the transmitter is further configured to send DCI signaling to trigger an aperiodic CSI report of the UE.

12. The base station according to claim 10, wherein each CSI feedback mode in the CSI report set involves a specific IMR.

13. The base station according to claim 10, wherein each CSI feedback mode in the CSI report set shares the same IMR.

14. The base station according to claim 6, wherein the DCI signaling comprises a CSI request field.

* * * * *